United States Patent
Wagner

(10) Patent No.: US 9,845,990 B2
(45) Date of Patent: Dec. 19, 2017

(54) STACKING SUPPORT

(71) Applicant: Pacific Western Timbers, Inc., Bremerton, WA (US)

(72) Inventor: John W. Wagner, Seabeck, WA (US)

(73) Assignee: PACIFIC WESTERN TIMBERS, INC., Bremerton, WA (US)

( * ) Notice: Subject to any disclaimer, the term of this patent is extended or adjusted under 35 U.S.C. 154(b) by 0 days.

(21) Appl. No.: 14/702,448

(22) Filed: May 1, 2015

(65) Prior Publication Data

US 2016/0316908 A1 Nov. 3, 2016

(51) Int. Cl.
| | |
|---|---|
| F26B 25/14 | (2006.01) |
| B65D 19/00 | (2006.01) |
| B62B 3/00 | (2006.01) |
| B62B 13/00 | (2006.01) |

(52) U.S. Cl.
CPC ............... *F26B 25/14* (2013.01); *B62B 3/00* (2013.01); *B62B 13/00* (2013.01); *B65D 19/0026* (2013.01); *B65D 2519/00323* (2013.01)

(58) Field of Classification Search
CPC .......... F26B 25/14; F26B 25/063; B62B 3/00; B62B 13/00; B65D 19/0026; B65D 2519/00323
USPC .................................................... 34/364, 508
See application file for complete search history.

(56) References Cited

U.S. PATENT DOCUMENTS

| | | | |
|---|---|---|---|
| 1,608,918 A * | 11/1926 | Alexander | F26B 25/185 |
| | | | 34/94 |
| 3,296,086 A * | 1/1967 | Boutin | G21C 5/04 |
| | | | 376/459 |
| 3,680,711 A | 8/1972 | Brucker | |
| 4,093,089 A | 6/1978 | Bohman | |
| 4,199,870 A | 4/1980 | Arsenault | |
| 4,221,292 A | 9/1980 | Koebel | |
| 4,698,896 A | 10/1987 | Osterwald et al. | |
| 4,788,777 A | 12/1988 | Davis | |
| 4,863,179 A * | 9/1989 | Isaacs | B60D 1/00 |
| | | | 280/33.996 |
| 5,577,619 A | 11/1996 | Callahan | |
| 5,588,372 A | 12/1996 | Kelly | |

(Continued)

FOREIGN PATENT DOCUMENTS

| | | | |
|---|---|---|---|
| CA | 2315046 A1 * | 2/2002 | ........... B65G 57/186 |
| DE | 2518940 A1 * | 11/1976 | ............... F16L 59/10 |

(Continued)

*Primary Examiner* — Stephen M Gravini
(74) *Attorney, Agent, or Firm* — Davis Wright Tremaine LLP; Heather M. Colburn

(57) ABSTRACT

A stacking support that has a plurality of sidewalls extending along a longitudinal axis that define an open ended longitudinally extending channel. The sidewalls may define a substantially square cross-sectional shape. Tubes and/or angled corner braces may be positioned at the corners of the substantially square cross-sectional shape. The stacking support may be constructed entirely of aluminum or an aluminum alloy. One or more items may be stacked upon two or more stacking supports. Optionally, the stacking support may be supported by at least one a slider, roller, or caster on a support surface. The stacking support may be coupled to an underside of a platform along with one or more like stacking supports to create a stacking assembly. One or more items may be stacked upon the stacking assembly.

28 Claims, 9 Drawing Sheets

(56) References Cited

U.S. PATENT DOCUMENTS

| | | | | |
|---|---|---|---|---|
| 5,704,134 | A | * | 1/1998 | Carter ................... F26B 25/185 211/59.4 |
| 5,722,626 | A | | 3/1998 | Menchetti et al. |
| 5,893,468 | A | | 4/1999 | Holmes |
| 5,954,465 | A | | 9/1999 | Ellerbush |
| 6,134,803 | A | * | 10/2000 | Gilchrist ............... F26B 25/185 34/239 |
| 6,199,488 | B1 | | 3/2001 | Favaron et al. |
| 6,431,372 | B1 | | 8/2002 | Aoyama |
| 6,598,847 | B2 | * | 7/2003 | Doucet ............. B65D 71/0092 108/56.3 |
| 6,928,933 | B2 | | 8/2005 | Grau |
| 7,874,125 | B2 | | 1/2011 | Polk, Jr. |
| 7,926,199 | B2 | | 4/2011 | Aaron |
| 7,963,731 | B2 | | 6/2011 | Baker et al. |
| 8,262,328 | B2 | | 9/2012 | Crane et al. |
| 8,371,456 | B2 | | 2/2013 | Scadden et al. |
| 2006/0091096 | A1 | | 5/2006 | Velez et al. |
| 2014/0209772 | A1 | | 7/2014 | Yeater |

FOREIGN PATENT DOCUMENTS

| | | | | |
|---|---|---|---|---|
| GB | 1470719 A | * | 4/1977 | ............... F26B 3/34 |
| KR | 20110020977 A | * | 3/2011 | |
| WO | 0012395 | | 3/2000 | |

* cited by examiner

US 9,845,990 B2

STACKING SUPPORT

BACKGROUND OF THE INVENTION

Field of the Invention

The present invention is directed generally to stacking supports used to dry, cure, store, ship, or otherwise transport products.

Description of the Related Art

Before being stored and/or shipped, products are typically stacked on a pallet. To help maintain the products on the pallet, sometimes, the products are banded or stretched wrapped to that pallet. Similarly, before materials are dried and/or cured, they are typically stacked on a wooden support (e.g., a wooden pallet, block, board, and the like). Conventionally, pallets are constructed from wood or plastic. Unfortunately, wooden pallets and wooden supports may be contaminated (e.g., with mold and/or by insects or other organisms) and require fumigation and/or other types of decontamination. Further, wooden pallets and wooden supports typically have a relatively short useful life of only a few months to a couple of years. Problems are also associated with plastic pallets. For example, plastic pallets are limited by the amount of weight they can bear. Therefore a need exists for alternatives to conventional wooden or plastic pallets and other types of wooden supports. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
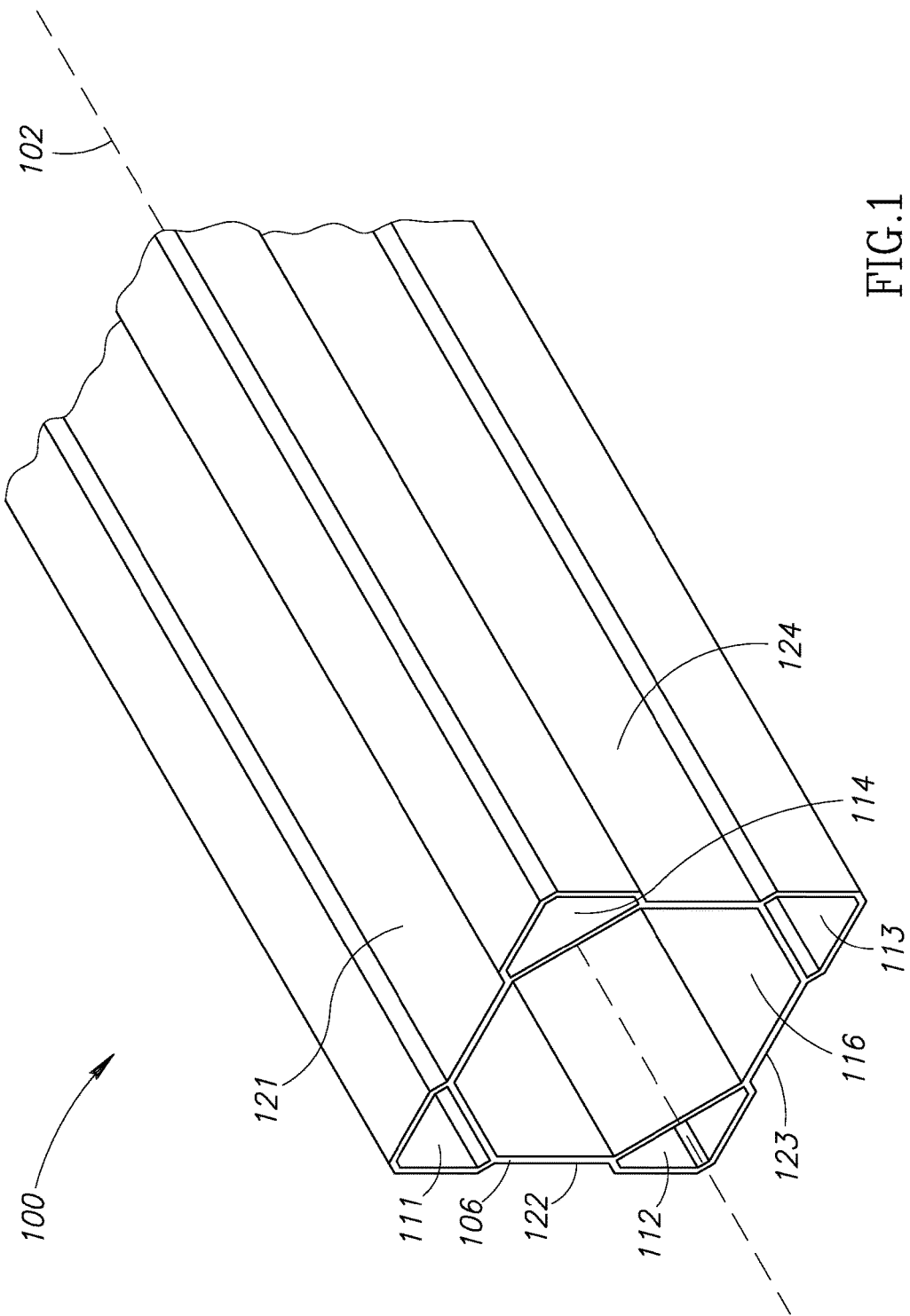
FIG. 1 is a perspective view of a second end of a stacking support.

FIG. 1 is perspective view a stacking support 100. The stacking support 100 extends along a longitudinal axis 102 and has a first end portion 104 (see FIG. 2) opposite a second end portion 106. The stacking support 100 has four longitudinally extending tubes 111-114 positioned around an open ended channel 116 that extends along the longitudinal axis 102. The channel 116 has a generally octagonal outer cross-sectional shape defined by the tubes 111-114 and four substantially identical sidewalls 121-124. In the embodiment illustrated, the sidewalls 121-124 are each substantially planar. However, this is not a requirement.

The tubes 111-114 are substantially identical to one another and each have a generally truncated triangular outer cross-sectional shape. The tube 111 is opposite the tube 113 across the channel 116, and the tube 112 is opposite the tube 114 across the channel 116.

The sidewall 122 extends between the tubes 111 and 112, and the sidewall 124 extends between the tubes 113 and 114. The sidewalls 122 and 124 are opposite one another across the channel 116. In the embodiment illustrated, the sidewalls 122 and 124 are substantially vertical and parallel to one another.

The sidewall 123 extends between the tubes 112 and 113, and the sidewall 121 extends between the tubes 114 and 111. The sidewalls 121 and 123 are opposite one another across the channel 116. In the embodiment illustrated, the sidewalls 121 and 123 are substantially horizontal and parallel to one another.

Figure 2:
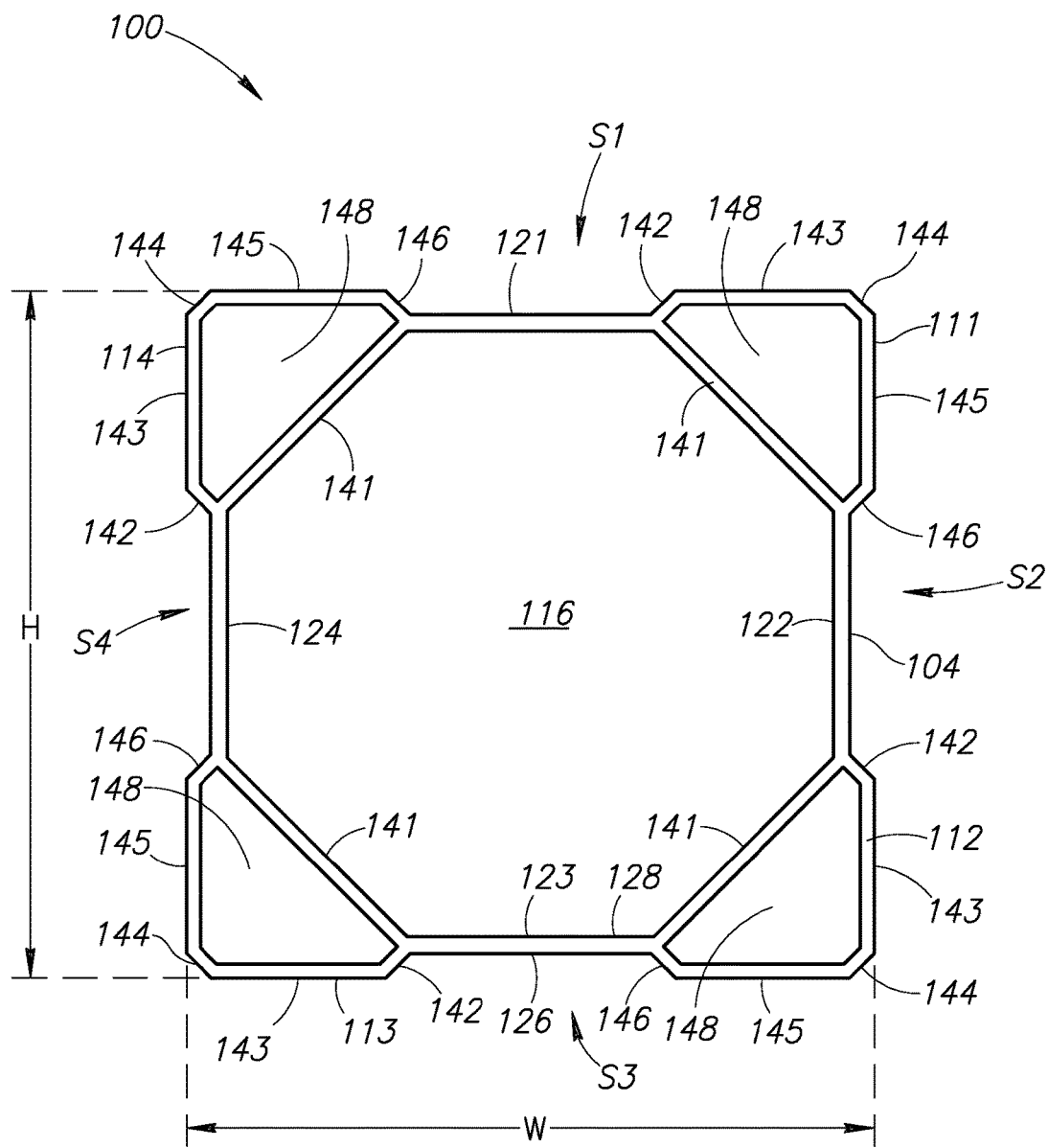
FIG. 2 is a first end view of the stacking support.

Referring to FIG. 2, each of the tubes 111-114 has six sidewalls 141-146. In the embodiment illustrated, the sidewalls 141-146 are each substantially planar. However, this is not a requirement. The sidewalls 141-146 define an open ended channel 148 that extends longitudinally alongside the channel 116 of the stacking support 100.

The sidewall 141 of each of the tubes 111-114 extends longitudinally along and defines a portion of the channel 116. The sidewall 141 of the tube 111 extends between the sidewalls 121 and 122. The sidewall 141 of the tube 112 extends between the sidewalls 122 and 123. The sidewall 141 of the tube 113 extends between the sidewalls 123 and 124. The sidewall 141 of the tube 114 extends between the sidewalls 124 and 121. Together, the sidewalls 121-124 and the sidewall 141 of each of the tubes 111-114 define the eight sided outer perimeter of the channel 116.

The sidewalls 142 and 146 extend outwardly from opposite ends of the sidewall 141. In the embodiment illustrated, the sidewalls 142 and 146 are substantially orthogonal to the sidewall 141, and substantially parallel with one another.

The sidewall 144 is spaced apart from and substantially parallel with the sidewall 141. The sidewalls 143 and 145 connect the sidewalls 142 and 146, respectively, to opposite ends of the sidewall 144. In the embodiment illustrated, the sidewalls 143 and 145 are substantially orthogonal with one another.

Referring to FIG. 2, as mentioned above, the tubes 111-114 each have a generally truncated triangular outer cross-sectional shape. In the geometric context, truncation refers to the removal of vertices from a triangle. The sidewalls 141, 143, and 145 define edges of a generally triangular outer cross-sectional shape. However, the sidewalls 141, 143, and 145 do not intersect to form vertices of a triangle. Instead, the sidewall 142 connects the sidewalls 141 and 143, the sidewall 144 connects the sidewalls 143 and 145, and the sidewall 146 connects the sidewalls 145 and 141. Thus, the cross-sectional shape of each of the tubes 111-114 appears as a triangle with its vertices (or points) removed and replaced with a line, which, as mentioned above, is a truncated triangle.

The tube 111 is aligned with the tube 112 such that the sidewall 145 of the tube 111 is substantially parallel and coplanar with the sidewall 143 of the tube 112. The sidewall 122 is offset (inwardly) from the sidewall 145 of the tube 111 and the sidewall 143 of the tube 112. However, the sidewall 122 may be substantially parallel with the sidewall 145 of the tube 111 and the sidewall 143 of the tube 112.

The tube 112 is aligned with the tube 113 such that the sidewall 145 of the tube 112 is substantially parallel and coplanar with the sidewall 143 of the tube 113. The sidewall 123 is offset (inwardly) from the sidewall 145 of the tube 112 and the sidewall 143 of the tube 113. However, the sidewall 123 may be substantially parallel with the sidewall 145 of the tube 112 and the sidewall 143 of the tube 113.

The tube 113 is aligned with the tube 114 such that the sidewall 145 of the tube 113 is substantially parallel and coplanar with the sidewall 143 of the tube 114. The sidewall 124 is offset (inwardly) from the sidewall 145 of the tube 113 and the sidewall 143 of the tube 114. However, the sidewall 124 may be substantially parallel with the sidewall 145 of the tube 113 and the sidewall 143 of the tube 114.

The tube 114 is aligned with the tube 111 such that the sidewall 145 of the tube 114 is substantially parallel and coplanar with the sidewall 143 of the tube 111. The sidewall 121 is offset (inwardly) from the sidewall 145 of the tube 114 and the sidewall 143 of the tube 111. However, the sidewall 121 may be substantially parallel with the sidewall 145 of the tube 114 and the sidewall 143 of the tube 111.

As shown in FIG. 2, when viewed from one end, the stacking support 100 has a generally square outer cross-sectional shape with the tubes 111-114 being positioned at the corners of the square. The tubes 111-114 help strengthen the stacking support 100 at these corners. By way of a non-limiting example, the stacking support 100 may have a height "H" of about 2.5 inches, a width "W" of about 2.5 inches, and a length "L" (see FIG. 4) along the longitudinal axis 102 (see FIG. 1) of about 4 feet.

Within its generally square outer cross-sectional shape, the stacking support 100 may be characterized as having a central region surrounded by four substantially identical outer sidewalls S1-S4. The channel 116 is located in the central region. The first outer sidewall S1 of the stacking support 100 is formed by the sidewalls 145 and 146 of the tube 114, the sidewall 121, and the sidewalls 142 and 143 of the tube 111. The second outer sidewall S2 of the stacking support 100 is formed by the sidewalls 145 and 146 of the tube 111, the sidewall 122, and the sidewalls 142 and 143 of the tube 112. The third outer sidewall S3 of the stacking support 100 is formed by the sidewalls 145 and 146 of the tube 112, the sidewall 123, and the sidewalls 142 and 143 of the tube 113. Finally, the fourth outer sidewall S4 of the stacking support 100 is formed by the sidewalls 145 and 146 of the tube 113, the sidewall 124, and the sidewalls 142 and 143 of the tube 114. The sidewalls 121-124 are recessed along the first, second, third, and fourth outer sidewalls S1-S4, respectively. Because the outer sidewalls S1-S4 are substantially identical to one another, the stacking support 100 may be characterized as being symmetric about both a vertical plane extending along the longitudinal axis 102 (see FIG. 1) and a horizontal plane extending along the longitudinal axis 102.

In the embodiment illustrated, the sidewall 144 of the tube 114 is positioned at a first corner and connects the fourth and first outer sidewalls S4 and S1 together. The sidewall 144 of the tube 111 is positioned at a second corner and connects the first and second outer sidewalls S1 and S2 together. The sidewall 144 of the tube 112 is positioned at a third corner and connects the second and third outer sidewalls S2 and S3 together. The sidewall 144 of the tube 113 is positioned at a fourth corner and connects the third and fourth outer sidewalls S3 and S4 together. In this characterization of the structures of the stacking support 100, the sidewalls 141 of the tubes 114, 111, 112, and 113 form sloped or angled corner braces at the first, second, third, and fourth corners, respectively.

In alternate embodiments, the sidewalls 144 of the tubes 111-114 may be omitted. In such embodiments, the fourth and first outer sidewalls S4 and S1 intersect to form the first corner, the first and second outer sidewalls S1 and S2 intersect to form the second corner, the second and third outer sidewalls S2 and S3 intersect to form the third corner, and the third and fourth outer sidewalls S3 and S4 intersect to form the third corner. Further, the sidewalls 141 of the tubes 114, 111, 112, and 113 may form angled corner braces at the first, second, third, and fourth corners, respectively.

The stacking support 100 may be used in a first orientation depicted in FIG. 2 in which the tubes 114 and 111 positioned above the tubes 112 and 113. Alternatively, the stacking support 100 may be used in a second orientation in which the stacking support 100 is rotated clockwise 90° about its longitudinal axis 102 (see FIG. 1) with respect to the first orientation. In the second orientation, the tubes 113 and 114 positioned above the tubes 111 and 112. By way of another non-limiting example, the stacking support 100 may be used in a third orientation in which the stacking support 100 is rotated clockwise 180° about its longitudinal axis 102 (see FIG. 1) with respect to the first orientation. In the third orientation, the tubes 112 and 113 are positioned above the tubes 111 and 114. By way of yet another non-limiting example, the stacking support 100 may be used in a fourth orientation in which the stacking support 100 is rotated clockwise 270° about its longitudinal axis 102 (see FIG. 1) with respect to the first orientation. In the fourth orientation, the tubes 111 and 112 are positioned above the tubes 113 and 114.

By way of a non-limiting example, a plurality of stacking supports each like the stacking support 100 may be manufactured by forming an extrusion that has the cross-sectional shape of the stacking support 100 (illustrated in FIG. 2) and a maximum length (e.g., about 40 feet). Then, the extrusion may be cut laterally into two or more sections (e.g., each having a length of about 2 feet, about 3 feet, about 4 feet, and the like) with each of the sections being one of the plurality of stacking supports.

Figure 3:
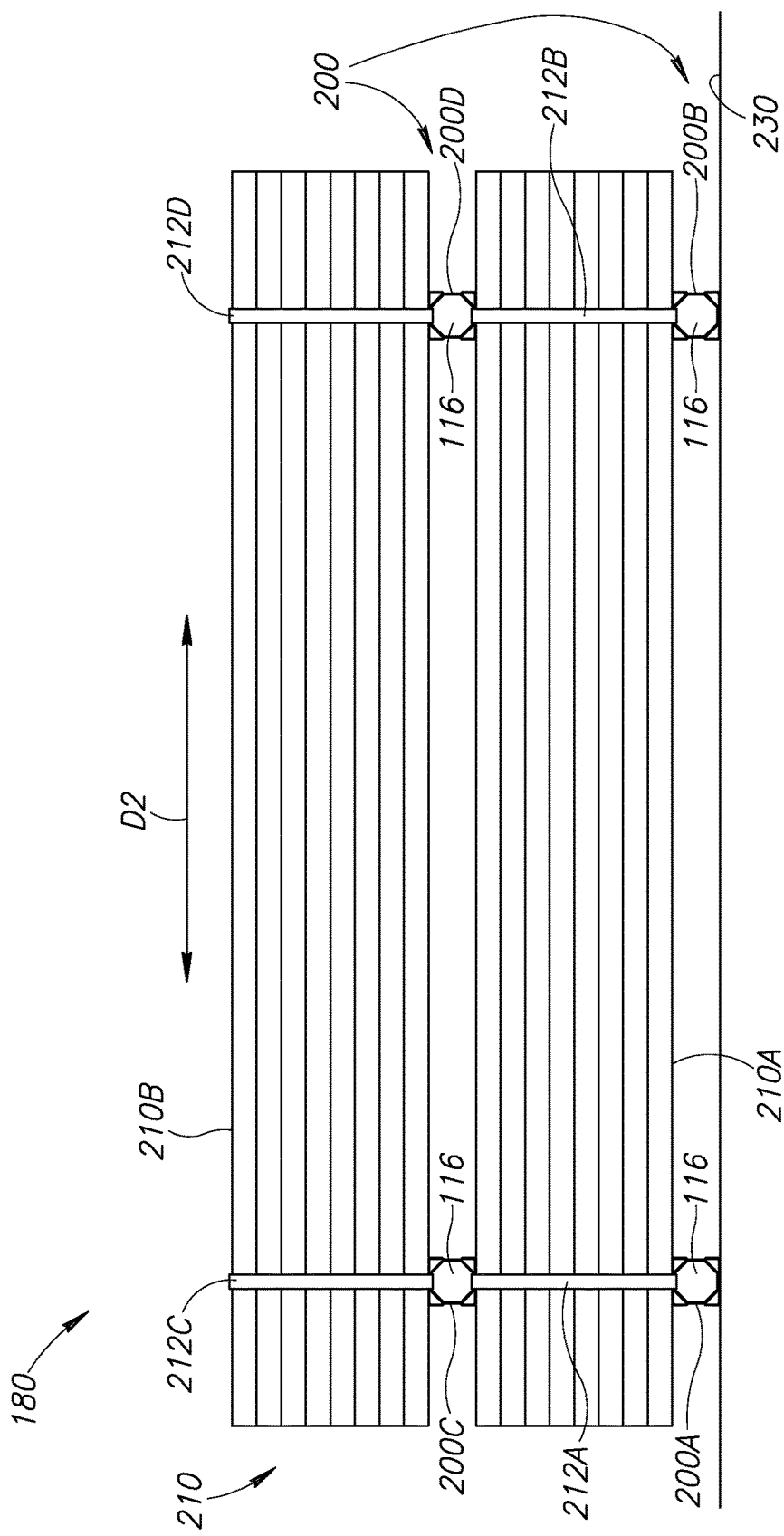
FIG. 3 is a view of a first side of an assembly that includes four stacking supports each like the stacking support of FIG. 1.

FIG. 3 depicts an assembly 180 resting on a support surface 230 (e.g., a floor). The assembly 180 includes a plurality of stacking supports 200 each like the stacking support 100. In the embodiment illustrated, the plurality of stacking supports 200 include stacking supports 200A-200D. For ease of illustration, each of the stacking supports 200 will be described as being in the first orientation shown in FIG. 2.

The assembly 180 also includes one or more products or items 210. In the embodiment illustrated, the assembly 180 includes first and second items 210A and 210B. Each of the one or more items 210 may include a single object or a stack of objects. By way of a non-limiting example, in FIG. 3, each of the items 210A and 210B is a stack of lumber. Alternatively, one or more of the items 210A and 210B may be crate or box. By way of another non-limiting example, one or more of the items 210A and 210B may be stack of sheet materials (e.g., plywood, cement board, particle board, and the like) or a stack of boxes.

Figure 4:
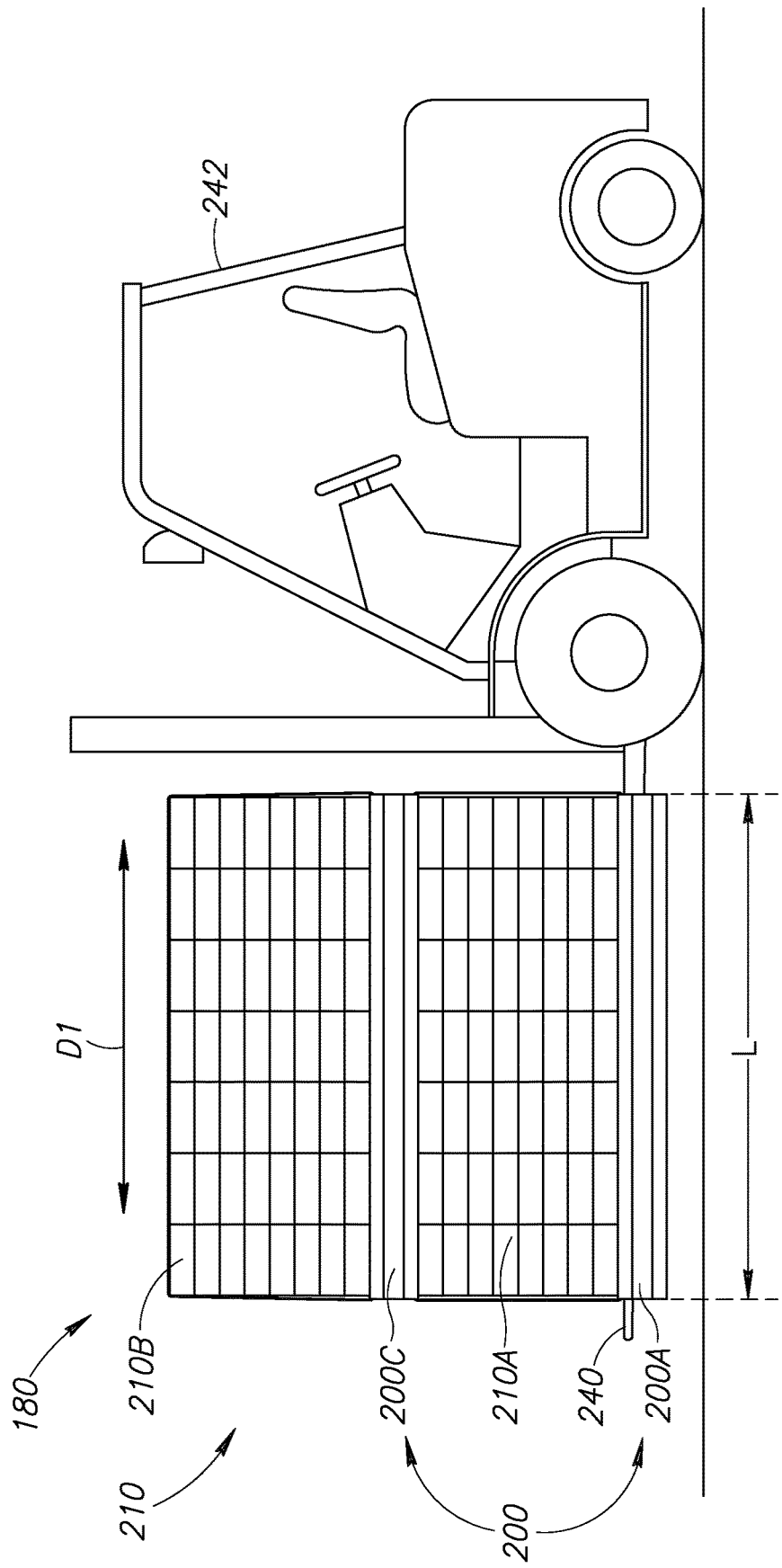
FIG. 4 is a view of a second side of the assembly of FIG. 3 being transported by a forklift.

The stacking supports 200 each extend longitudinally along a first direction (identified by a double headed arrow "D1" in FIG. 4), and the one or more items 210 each extend longitudinally along a second direction (identified by a double headed arrow "D2"). The first and second directions may be substantially orthogonal to one another. Thus, the stacking supports 200 are substantially perpendicular to the one or more items 210. Further, as shown in FIG. 4, when one or more of the items 210 is a stack (e.g., of lumber), sub-items within the stack may be arranged along the first direction (identified by the double headed arrow "D1") on top of two or more of the stacking supports 200.

Referring to FIG. 3, optionally, the assembly 180 includes a strap or band for each of the stacking supports 200. In the embodiment illustrated, the assembly 180 includes bands 212A-212D. The bands 212A-212D may be implemented as conventional metal bands used to tie items to pallets and/or to tie items together. In the embodiment illustrated, the stacking supports 200A-200D are disconnected from one another before the bands 212A-212D are applied. After the bands 212A-212D are applied, the stacking supports 200A and 200C are coupled together, and the stacking supports 200B and 200D are coupled together. However, the stacking support 200A remains uncoupled from the stacking supports 200B and 200D, and the stacking support 200B remains uncoupled from the stacking supports 200A and 200C. Thus, the stacking supports 200A and 200B (between the first item 210A and the support surface 230) are disconnected from one another. Similarly, the stacking supports 200C and 200D (between the first and second items 210A and 210B) are disconnected from one another. In other words, those of the stacking supports 200 that are aligned vertically within the assembly 180 may be coupled together by one or more bands. On the other hand, those of the stacking supports 200 that are aligned horizontally within the assembly 180 may remain disconnected from one another.

As mentioned above, the stacking supports 200A and 200B are positioned in between the support surface 230 and the first item 210A. Referring to FIG. 2, the first item 210A (see FIG. 3) rests upon the sidewalls 145 and 143 of the tubes 114 and 111, respectively, of the stacking support 200A (see FIG. 3). The sidewalls 145 and 143 of the tubes 112 and 113, respectively, of the stacking support 200A (see FIG. 3) rest upon the support surface 230 (see FIG. 3). At the same time, the first item 210A (see FIG. 3) rests upon the sidewalls 145 and 143 of the tubes 114 and 111, respectively, of the stacking support 200B (see FIG. 3). The sidewalls 145 and 143 of the tubes 112 and 113, respectively, of the stacking support 200B (see FIG. 3) rest upon the support surface 230 (see FIG. 3). Referring to FIG. 3, the stacking supports 200A and 200B space the first item 210A vertically from the support surface 230 such that forks 240 (see FIG. 4) of a forklift or fork truck 242 (see FIG. 4) may pass therebetween.

The stacking supports 200C and 200D are positioned in between the first and second items 210A and 210B. Referring to FIG. 2, the second item 210B (see FIG. 3) rests upon the sidewalls 145 and 143 of the tubes 114 and 111, respectively, of the stacking support 200C (see FIG. 3). The sidewalls 145 and 143 of the tubes 112 and 113, respectively, of the stacking support 200C (see FIG. 3) rest upon the first item 210A (see FIG. 3). At the same time, the second item 210B (see FIG. 3) rests upon the sidewalls 145 and 143 of the tubes 114 and 111, respectively, of the stacking support 200D (see FIG. 3). The sidewalls 145 and 143 of the tubes 112 and 113, respectively, of the stacking support 200D (see FIG. 3) rest upon the first item 210A (see FIG. 3). Referring to FIG. 3, the stacking supports 200C and 200D separate the vertically adjacent items 210A and 210B and help stabilize the items (e.g., stacks of lumber) within the assembly 180.

While FIG. 3 depicts only two of the stacking supports 200 (e.g., the stacking supports 200C and 200D) positioned between vertically adjacent ones of the items 210 (e.g., the items 210A and 210B), three or more of the stacking supports 200 may be used. Further, while FIG. 3 depicts only two of the stacking supports 200 (e.g., the stacking supports 200A and 200B) positioned between the item 210A and the support surface 230, three or more of the stacking supports 200 may be positioned in between the first item 210A and the support surface 230. Additionally, when the assembly 180 includes three of more items, each pair of vertically adjacent items may be separated by two or more stacking supports.

The optional bands 212C and 212D tie the second item 210B to the stacking supports 200C and 200D. The optional band 212C is wrapped around the second item 210B and passes longitudinally through the channel 116 of the stacking support 200C. The tubes 114 and 111 (see FIGS. 1 and 2) of the stacking support 210C help position the optional band 212C along the sidewall 121 (see FIGS. 1 and 2) of the stacking support 210C between the tubes 114 and 111 of the stacking support 210C. Because the sidewalls 141 (which as described above may be characterized as being angled corner braces) of the tubes 114 and 111 are angled, the optional band 212C may slide therealong and toward the sidewall 121 of the stacking support 210C, which helps position the optional band 212C alongside the sidewall 121 of the stacking support 210C.

Similarly, the optional band 212D is wrapped around the second item 210B and passes longitudinally through the channel 116 of the stacking support 200D. The tubes 114 and 111 (see FIGS. 1 and 2) of the stacking support 210D help position the optional band 212D along the sidewall 121 (see FIGS. 1 and 2) of the stacking support 210D between the tubes 114 and 111 of the stacking support 210D. Because the sidewalls 141 of the tubes 114 and 111 are angled, the optional band 212D may slide therealong and toward the sidewall 121 of the stacking support 210D, which helps position the optional band 212D alongside the sidewall 121 of the stacking support 210D.

The optional bands 212A and 212B tie the first item 210A to the stacking supports 200A-200D. Thus, the optional bands 212A and 212B also tie the first and second items 210A and 210B together. The optional band 212A is wrapped around the first item 210A and passes longitudinally through the channel 116 of each of the stacking supports 200A and 200C. The tubes 114 and 111 (see FIGS. 1 and 2) of the stacking support 200A help position the optional band 212A along the sidewall 121 (see FIGS. 1 and 2) of the stacking support 200A. Because the sidewalls 141 of the tubes 114 and 111 are angled, the optional band 212A may slide therealong and toward the sidewall 121 of the stacking support 200A, which helps position the optional band 212A alongside the sidewall 121 of the stacking support 200A. Further, the tubes 112 and 113 (see FIGS. 1 and 2) of the stacking support 210C help position the optional band 212A along the sidewall 123 (see FIGS. 1 and 2) of the stacking support 210C. Because the sidewalls 141 of the tubes 112 and 113 of the stacking support 210C are angled, the optional band 212A may slide therealong and toward the sidewall 123 of the stacking support 210C, which helps position the optional band 212A alongside the sidewall 123 of the stacking support 210C.

Similarly, the optional band 212B is wrapped around the first item 210A and passes longitudinally through the channel 116 of each of the stacking supports 200B and 200D. The tubes 114 and 111 (see FIGS. 1 and 2) of the stacking support 200B help position the optional band 212B along the sidewall 121 (see FIGS. 1 and 2) of the stacking support 200B.

Because the sidewalls 141 of the tubes 114 and 111 are angled, the optional band 212B may slide therealong and toward the sidewall 121 of the stacking support 200B, which helps position the optional band 212B alongside the sidewall 121 of the stacking support 200B. Further, the tubes 112 and 113 (see FIGS. 1 and 2) of the stacking support 210D help position the optional band 212B along the sidewall 123 (see FIGS. 1 and 2) of the stacking support 210D. Because the sidewalls 141 of the tubes 112 and 113 of the stacking support 210D are angled, the optional band 212B may slide therealong and toward the sidewall 123 of the stacking support 210D, which helps position the optional band 212B alongside the sidewall 123 of the stacking support 210D.

Two or more of the stacking supports 200 (e.g., the stacking supports 200A and 200B) spaced apart along the second direction (identified by the double headed arrow "D2") may be used instead of conventional wooden pallet. In particular, the stacking supports 200 may be used to stack lumber for transport and storage.

The assembly 180 may be constructed by positioning at least two (e.g., the stacking supports 200C and 200D) of the stacking supports 200 (oriented to extend along the first direction) directly on top of the support surface 230. Next, the second item 210B (oriented to extend along the second direction) is positioned directly on top of the stacking supports 200C and 200D. Then, the second item 210B is banded to the stacking supports 200C and 200D using the optional bands 212C and 212D as shown in FIG. 3 and described above. Thus, at this point, a subassembly has been constructed that includes the stacking supports 200C and 200D, the second item 210B, and the optional bands 212C and 212D.

Additional items may be added to the assembly 180 by positioning at least two (e.g., the stacking supports 200A and 200B) of the stacking supports 200 (oriented to extend along the first direction) directly on top of the support surface 230. Next, the first item 210A (oriented to extend along the second direction) is positioned directly on top of those stacking supports (e.g., the stacking supports 200A and 200B). Then, the subassembly (oriented such that the second item 210B extends along the second direction) constructed as described above is placed on top of the first item 210A. Finally, the first item 210A is banded to the stacking supports 200A-200D using the optional bands 212A and 212B as shown in FIG. 3 and described above.

Because the stacking support 100 (see FIGS. 1, 2, and 6-9) may be used in any of the first, second, third, or fourth orientations, users cannot position the stacking support 100 incorrectly. In contrast, wooden supports (e.g., a wooden pallet) sometimes have a channel or groove formed in their undersides that must be positioned to open downwardly. Thus, users sometimes position them incorrectly. The groove is configured to receive and recess a band (like the bands 212A-212D) so that the band does not contact and wear against the support surface 230. Unfortunately, sometimes the groove is not deep enough or the band is not properly placed inside the groove. When this occurs, the band may wear against the support surface 230 and break. The stacking support 100 protects the band and avoids this problem. Specifically, the stacking support 100 includes the channel 116 through which the band passes protected from wear against other surfaces (such as the support surface 230) by the sidewalls 121-124 and the tubes 111-114.

FIG. 4 depicts the fork truck 242 lifting and moving the assembly 180. As shown in FIG. 4, the stacking supports 200 are spaced apart along the second direction (identified by the double headed arrow "D2" in FIG. 3) such that the forks 240 of the fork truck 242 may be positioned between those of the stacking supports 200 positioned under the first item 210A. Thus, the forks 240 may contact the underside of the first item 210A and lift the assembly 180 by applying an upward force to the underside of the first item 210A.

Figure 5:
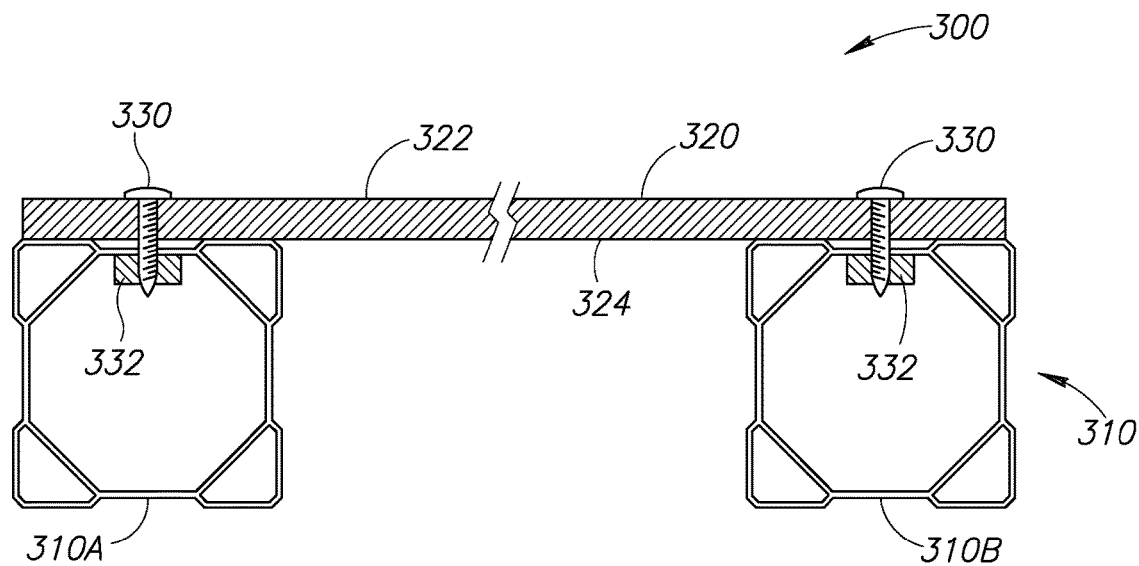
FIG. 5 is a side view of an assembly that includes a plurality of stacking supports each like the stacking support of FIG. 1 coupled to a platform.

FIG. 5 depicts an assembly 300 that includes a plurality of stacking supports 310 each like the stacking support 100 (see FIGS. 1, 2, and 6-9). The assembly 300 also includes a deck or platform 320 having an upper surface 322 opposite a lower surface 324. The stacking supports 310 are coupled to the lower surface 324 by fasteners 330. In other words, the stacking supports 310 are coupled to the underside of the platform 320. For ease of illustration, each of the stacking supports 310 will be described as being in the first orientation shown in FIG. 2. Optionally, at least one block 332 may be positioned inside the channel 116 alongside the sidewall 121. Then, for each of the stacking supports 310, one or more of the fasteners 330 may be used to couple the platform 320 to the stacking support and the one or more blocks 332 inside the channel 116 of the stacking support. The assembly 300 may be used instead of a conventional pallet. For example, items (e.g., boxes) may be stacked upon the upper surface 322 of the platform 320 and banded or stretch wrapped to the assembly 300.

Figure 6:
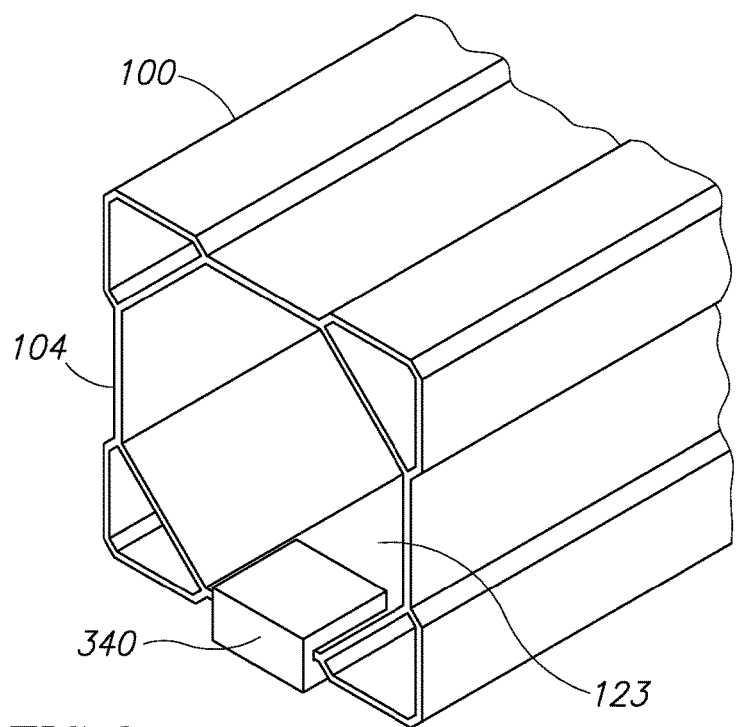
FIG. 6 is a perspective view of the first end of the stacking support of FIG. 1 and a first embodiment of a slider.
Figure 9:
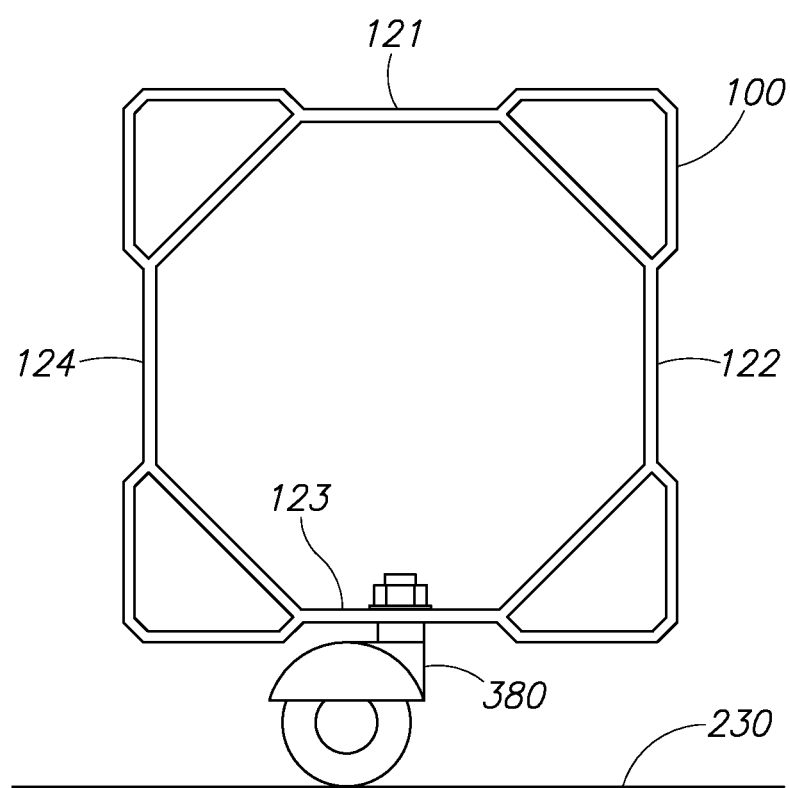
FIG. 9 is a first end view of the stacking support of FIG. 1 supported by a castor.

Referring to FIG. 6, a different generally U-shaped slider 340 may be clipped to the sidewall 123 at each of the end portions 104 and 106 (see FIG. 1) of the stacking support 100 when the sidewall 123 is adjacent the support surface 230 (see FIGS. 3 and 9). At least a portion of each of the sliders 340 extends along an outwardly facing surface of the sidewall 123, and is positioned between the sidewall 123 and the support surface 230. This portion of the sliders 340 spaces the stacking support 100 upwardly away from the support surface 230. The sliders 340 are configured to reduce friction between the stacking support 100 and the support surface 230 such that the stacking support 100 (and any materials or items stacked thereupon) may be slid along the support surface 230 (e.g., manually by a user). By way of a non-limiting example, each of the sliders 340 may be constructed from or coated with an ultra-high molecular weight ("UHMW") plastic, polytetrafluoroethylene ("PTFE"), and the like. For example, the sliders 340 may be constructed from or coated with TEFLON® material.

Figure 7:
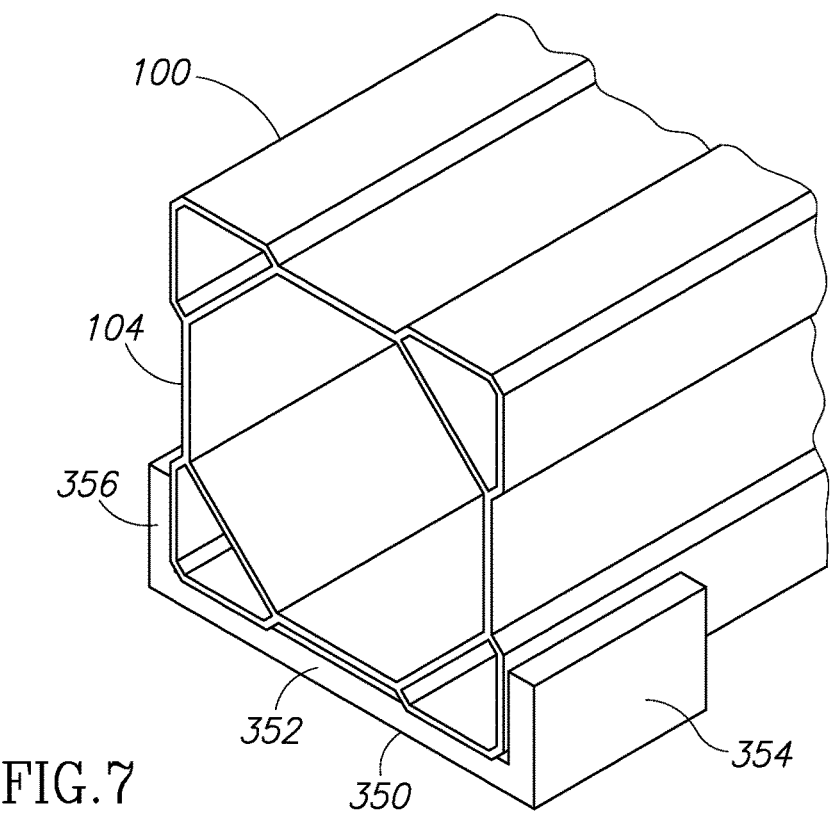
FIG. 7 is a perspective view of the first end of the stacking support of FIG. 1 positioned upon a second embodiment of a slider.

Referring to FIG. 7, optionally, one or more sliders 350 may be placed between the stacking support 100 and the support surface 230 (see FIGS. 3 and 9). Each slider 350 is configured to reduce friction between the stacking support 100 and the support surface 230 such that the stacking support 100 (and any materials or items stacked thereupon) may be slid along the support surface 230 (e.g., manually by a user). In the embodiment illustrated, each slider 350 is generally U-shaped having a base portion 352 and side portions 354 and 356 that extend away from opposite ends of the base portion 352 in substantially identical directions. The stacking support 100 rests upon the base portion 352 in between the side portions 354 and 356, which flank the stacking support 100. The base portion 352 spaces the stacking support 100 upwardly away from the support surface 230. The side portions 354 and 356 function as stop walls and help prevent the stacking support 100 from sliding laterally with respect to the base portion 352 and disengaging from the slider 350. The slider 350 may be constructed from any material suitable for constructing the sliders 340.

Figure 8:
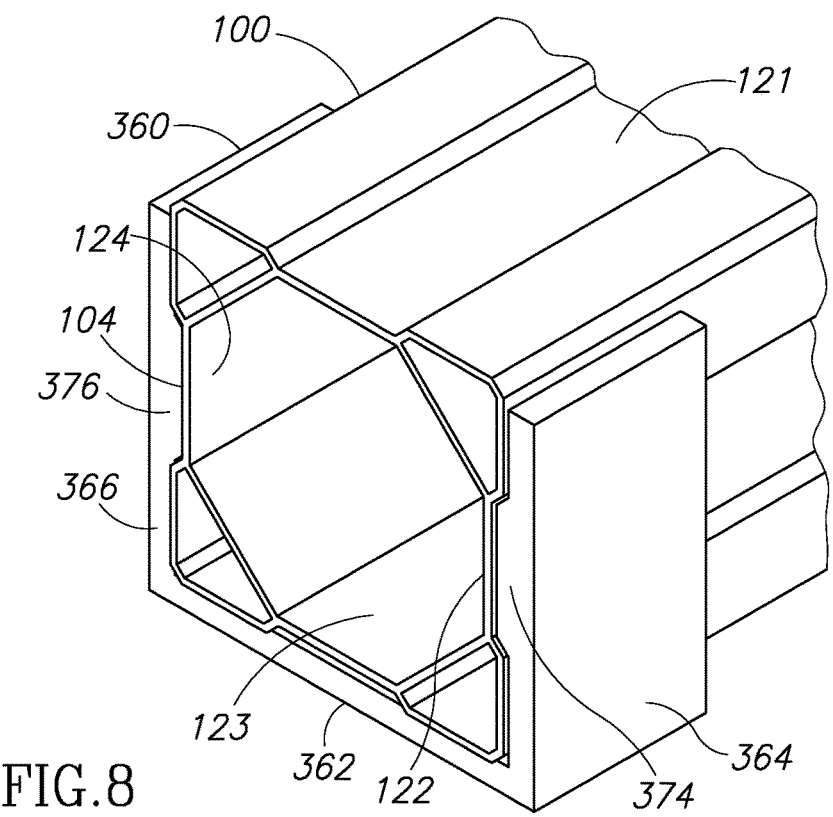
FIG. 8 is a perspective view of the first end of the stacking support of FIG. 1 positioned upon a third embodiment of a slider.

Referring to FIG. 8, optionally, one or more sliders 360 may be placed between the stacking support 100 and the support surface 230 (see FIGS. 3 and 9). Each slider 360 is configured to reduce friction between the stacking support 100 and the support surface 230 such that the stacking support 100 (and any materials or items stacked thereupon) may be slid along the support surface 230 (e.g., manually by a user). The slider 360 may be constructed from any material suitable for constructing the sliders 340.

In the embodiment illustrated, each slider 360 is generally U-shaped having a base portion 362 and side portions 364 and 366 that extend away from opposite ends of the base portion 362 in substantially identical directions. The stacking support 100 rests upon the base portion 362 in between the side portions 364 and 366, which flank the stacking support 100. The base portion 362 spaces the stacking support 100 upwardly away from the support surface 230.

The side portions 364 and 366 function as stop walls and help prevent the stacking support 100 from sliding laterally with respect to the base portion 362 and disengaging from the slider 360. The side portions 364 and 366 are contoured along their inwardly facing surfaces to follow the outer profile of the stacking support 100. Thus, a portion 374 of the side portion 364 is adjacent the sidewall 122, and a portion 376 of the side portion 366 is adjacent the sidewall 124. The portions 374 and 376 may function as tabs that when received inside channels adjacent the recessed sidewalls 122 and 124, clip the slider 360 to the stacking support 100. A different slider, each like the slider 360, may be slid onto each of the first and second end portions 104 and 106 (see FIG. 1) of the stacking support 100 with the portions 374 and 376 of each slider positioned alongside the recessed sidewalls 122 and 124.

Referring to FIG. 9, optionally, one or more rollers or casters 380 be coupled to the stacking support 100 (e.g., to the sidewall 123 when the stacking support 100 is in the first orientation depicted in FIG. 9) and positioned between the stacking support 100 and the support surface 230. In such embodiments, the stacking support 100 (and any materials or items stacked thereupon) may be rolled along the support surface 230 (e.g., manually by a user) on the one or more rollers or casters 380.

Figure 10:
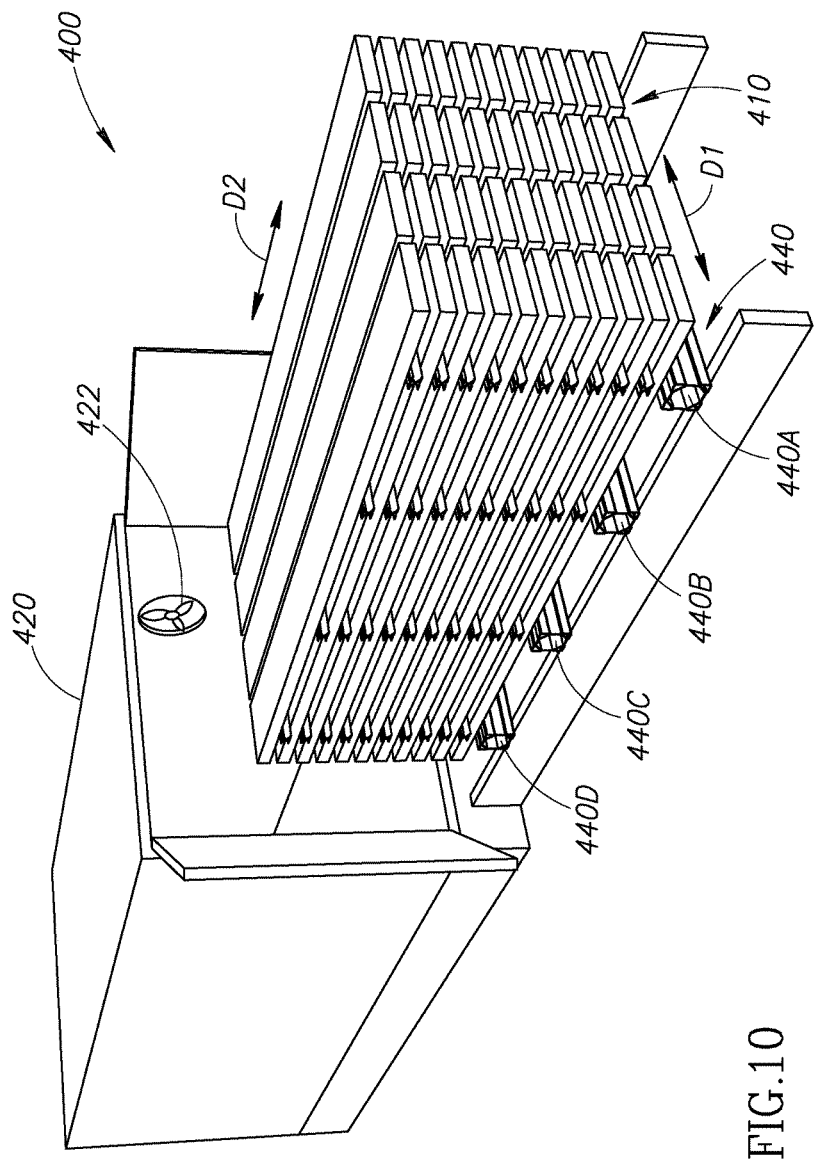
FIG. 10 is a perspective view of a stack of lumber supported by a plurality of stacking supports each like the stacking support of FIG. 1.

In addition to being used to store and/or transport materials, the stacking support 100 may be used to dry and/or cure materials (e.g., lumber, cement board, and the like). For example, FIG. 10 depicts a stack 400 of lumber ready to be placed inside a kiln 420 and dried. Within the stack 400, a plurality of boards 410 are arranged in rows, with a plurality of spaced apart stickers (that each extends longitudinally along the first direction identified by the double headed arrow "D1") separating adjacent rows of the boards 410. Non-limiting examples of stickers that may be used are described in U.S. patent application Ser. No. 14/676,156, filed on Apr. 1, 2015, and titled "Stickers for Drying and/or Curing Materials," which is incorporated herein by reference in its entirety. Within each row, the boards 410 extend longitudinally along the second direction (identified by the double headed arrow "D2").

The stack 400 is supported by a plurality of stacking supports 440 each like the stacking support 100 (see FIGS. 1, 2, and 6-9). In the embodiment illustrated, the plurality of stacking supports 440 include stacking supports 440A-440D. For ease of illustration, each of the stacking supports 440 will be described as being in the first orientation shown in FIG. 2.

Figure 11:
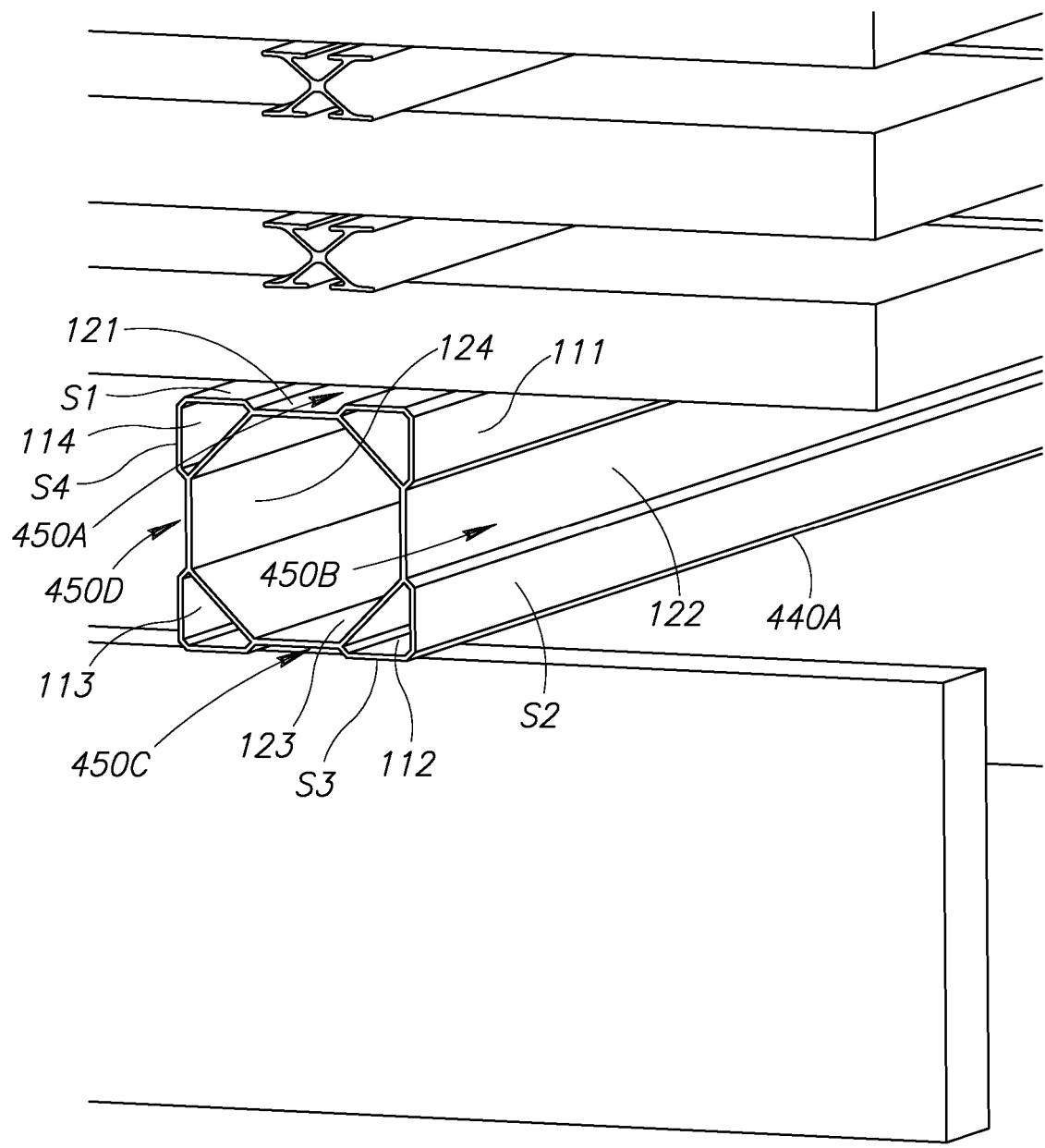
FIG. 11 is an enlargement of a portion of FIG. 10.

The stacking supports 440 provide improved airflow compared to conventional wooden block supports. For example, referring to FIG. 2, because the sidewalls 121-124 are spaced inwardly from (or recessed with respect to) the sidewalls 143 and 145 (see FIG. 2) of the tubes 111-114, the stacking supports 440 each include airflow channels 450A-450D (see FIG. 11) formed in the outer sidewalls S1-S4, respectively. Air is able to flow through any of the airflow channels 450A-450D that happen to be immediately adjacent the underside of the stack 400. This airflow passes alongside the boards 410 where the boards 410 contact one of the stacking supports 440, which improves drying and reduces stain on the boards 410 caused by uneven drying or curing.

Referring to FIG. 10, the kiln 420 may include one or more fans 422 configured to circulate air inside the kiln 420. After the stack 400 is placed inside the kiln 420, the drying and/or curing process begins. During the drying and/or curing process, a temperature inside the kiln 420 may be increased and/or the one or more fans 422 may be activated to blow air toward the stack 400. Air (e.g., circulated by the one or more fans 422) travels between the boards 410, around the stack 400, and through the airflow channels 450A-450D and the channels 116 of the stacking supports 440. When the boards 410 are dry, the stack 400 is removed from the kiln 420.

Conventionally, a wooden support (such as a wooden block, board, or pallet) is used to support a stack of lumber (like the stack 400) or sheet material for drying and/or curing. Such wooden structures have a generally square or rectangular solid cross-sectional shape with a continuous upper surface that does not provide any airflow channels (like the channels 450A and 450B). The upper surface of the wooden support contacts and covers a larger portion of the underside of the stack than is covered by one of the outer sidewalls S1-S4 of one of the stacking supports 440. Thus, the stacking supports 440 reduce dry time, which makes the underside of the stack less susceptible to staining caused by uneven drying and/or curing.

The stacking supports 440 may flex and/or deflect longitudinally. Along their length, the stacking supports 440 are substantially straight and after deflecting laterally, return to being substantially straight. Further, the stacking supports 440 resist such deflection and try to return to their original shape. Thus, the stacking supports 440 push against the stack 400 to help keep the stack 400 (and the materials therein) substantially straight and/or flat. In other words, the stacking supports 440 help prevent materials (e.g., lumber, cement board, and the like) from warping.

Referring to FIGS. 1, 2, and 6-9, an amount of weight that the stacking support 100 may support is determined at least in part by the thickness of the sidewalls 121-124 and 141-146. Thus, the stacking support 100 may be made stronger (and able to support more weight) by increasing the thickness of the sidewalls 121-124 and 141-146. By way of a non-limiting example, the stacking support 100 may be configured to support up to about 20,000 pounds. Further, the stacking support 100 may be configured to have a useful life (e.g., about 10 years) that is greater than the useful life of a conventional wooden pallet.

The stacking support 100 may be constructed from a material that does not absorb (or wick) moisture. Additionally, the stacking support 100 may be constructed from a material that resists mold and/or does not provide a growth medium (e.g., wood, sap, and the like) for mold or other organisms. By way of a non-limiting example, the stacking support 100 may be constructed from a material other than solid wood, such as an inorganic material. By way of additional non-limiting examples, the stacking support 100 may be constructed from aluminum, a material that includes aluminum (e.g., an aluminum alloy), plastic, carbon fiber, and the like. Non-limiting examples of suitable aluminum alloys that may be used to construct the stacking support 100 include 6063-T6 and 6005A.

By way of a non-limiting example, plastic, aluminum, or an aluminum alloy may be extruded to form the stacking support 100. By using aluminum or an aluminum alloy, the stacking support 100 may have improved uniformity (both in terms of flatness and straightness) compared to conventional wooden pallets and wooden supports. This helps improve uniformity across multiple stacks for storage and/or transport. Further, when the items stacked using the stacking support 100 are lumber, the stacking support 100 helps keep the lumber straight and avoids warping.

Further, the stacking support 100 may have better dimensional stability and strength compared to conventional wooden pallets. This allows the stacking support 100 to return to their original shape even after multiple uses and have a longer useful life than conventional wooden pallets.

When the stacking support 100 is constructed using a material that includes aluminum (e.g., aluminum, an aluminum alloy, and the like) the stacking support 100 may be lighter in weight than a conventional wooden pallet and therefore, help reduce transportation costs.

Unlike conventional wooden pallets, which can lose their strength and dimensional stability, the stacking support 100 may be constructed using a recycled and recyclable material (e.g., aluminum, an aluminum alloy, and the like) that has a much longer useful life. When the stacking support 100 is worn out, damaged, or otherwise rendered unusable, the stacking support 100 may be recycled and new stacking supports (like the stacking support 100) constructed from the recycled material.

When the stacking support 100 is used to cure or dry materials, the materials stacked upon and/or separated by a plurality of the stacking supports 100 will dry or cure straighter and/or flatter. This helps improve productivity and/or yield of a processing facility and allows the materials to be manufactured with closer tolerances. Further, the stacking support 100 may have better dimensional stability and strength compared to conventional wooden pallets and wooden supports. This allows the stacking support 100 to return to their original shape even after being subjected to multiple cycles of the drying and/or curing process, each of which subjects the stacking support 100 to heat, moisture, and pressure.

Air may flow more consistently (e.g., at a more consistent speed) through materials stacked using the stacking support 100 than through materials stacked using conventional wooden pallets or supports because the stacking support 100 are straighter and/or flatter. Thus, more consistent pathways for airflows are defined within the stack (e.g., the stack 400, and the like). Referring to FIG. 10, when two or more substantially similar stacks are placed inside the kiln 420, those stacks will have dimensions that are more consistent. Thus, the stacks may be better aligned with one another inside the kiln 420. This allows for smoother and/or more consistent airflow through, between, and around the stacks.

As is appreciated by those of ordinary skill in the art, conventional wood pallets and wooden supports tend to absorb moisture and require additional drying prior to the main drying process. An amount of energy required to dry materials (e.g., lumber) may be reduced by using a material (e.g., aluminum, an aluminum alloy, and the like) to construct the stacking support 100 that does not absorb (or wick) moisture and has suitable heat transfer characteristics. Using a material (e.g., aluminum, an aluminum alloy, and the like) to construct the stacking support 100 that provides a heat transfer rate (or thermal conductivity) that is greater than that of wood helps reduce the amount of energy needed to dry and/or cure materials, and helps bring the temperature of those materials up to a desired temperature more quickly.

Using a material (e.g., aluminum, an aluminum alloy, and the like) to construct the stacking support 100 that does not absorb (or wick) moisture helps reduce the size of the thermal mass that needs to be heated to effectuate the drying process because the stacking support 100 themselves do not need to dry. Further, when the stacking support 100 are constructed using aluminum or an aluminum alloy, they can withstand higher temperatures than conventional wooden pallets and wooden supports.

Conventional wooden pallets and wooden supports have rough outer surfaces. Airflow within and alongside the stacking support 100 may be improved by constructed them using a material (e.g., aluminum, an aluminum alloy, and the like) and/or process (e.g., extrusion) that provides finished (or substantially smooth) surfaces. Such surfaces also help avoid injuries to users that may be caused by sharp edges and/or slivers that may be present in wooden pallets and wooden supports.

Because of the qualities described above, the stacking support 100 may be used to implement an improved drying and/or curing process that is faster, more uniform, and uses less energy than prior art drying and/or curing processes. Further, the improved drying and/or curing process may produce an end product (e.g., lumber, cement board, and the like) that is flatter and more uniform than can be achieved by prior art drying and/or curing processes.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A stacking support comprising:
   a plurality of tubes that are spaced apart and extend longitudinally, the plurality of tubes comprising first, second, third, and fourth tubes, the first tube having a first support sidewall, the second tube having a second support sidewall substantially coplanar with the first support sidewall, the third tube having a third support sidewall, the fourth tube having a fourth support sidewall substantially coplanar with the third support sidewall, the first and second tubes being a first adjacent pair of tubes, the third and fourth tubes being a different second adjacent pair of tubes; and
   a plurality of sidewalls that extend longitudinally, the plurality of sidewalls comprising first and second sidewalls, the first sidewall connecting together the first and second tubes, the second sidewall connecting together the third and fourth tubes, together the plurality of tubes and the plurality of sidewalls defining a longitudinally extending channel.

2. The stacking support of claim 1 for use with a support surface, the stacking support further comprising:
   a slider, roller, or caster configured to support the stacking support on the support surface.

3. The stacking support of claim 1 constructed entirely of a material that includes aluminum.

4. The stacking support of claim 1, wherein the channel has a substantially octagonal cross-sectional shape.

5. The stacking support of claim 1, wherein the first sidewall is substantially parallel with the first and second support sidewalls and offset inwardly therefrom, and
   the second sidewall is substantially parallel with the third and fourth support sidewalls and offset inwardly therefrom.

6. The stacking support of claim 1, wherein the first sidewall has a first end opposite a second end,
   the first tube comprises a first sloped sidewall connected to the first end of the first sidewall,
   the second tube comprises a second sloped sidewall connected to the second end of the first sidewall,
   the first and second sloped sidewalls being configured to help position a band extending longitudinally through the channel alongside the first sidewall.

7. The stacking support of claim 6, wherein the second sidewall has a first end opposite a second end,
   the third tube comprises a third sloped sidewall connected to the first end of the second sidewall,
   the fourth tube comprises a fourth sloped sidewall connected to the second end of the second sidewall,
   the third and fourth sloped sidewalls being configured to help position a band extending longitudinally through the channel alongside the second sidewall.

8. The stacking support of claim 1, wherein each of the plurality of tubes has a substantially truncated triangular cross-sectional shape.

9. The stacking support of claim 1, wherein the plurality of sidewalls comprise third and fourth sidewalls,
   the third sidewall connects together the second and third tubes,
   the fourth sidewall connects together the first and fourth tubes,
   the first tube comprises a first angled sidewall that connects together the first and fourth sidewalls,
   the second tube comprises a second angled sidewall that connects together the first and third sidewalls,
   the third tube comprises a third angled sidewall that connects together the second and third sidewalls,
   the fourth tube comprises a fourth angled sidewall that connects together the second and fourth sidewalls,
   the channel being defined by the first, second, third, and fourth angled sidewalls and the first, second, third, and fourth sidewalls.

10. The stacking support of claim 9, wherein each of the first, second, third, and fourth tubes has a substantially truncated triangular cross-sectional shape.

11. The stacking support of claim 9, wherein the first sidewall is substantially parallel with the first and second support sidewalls and offset inwardly therefrom, and
    the second sidewall is substantially parallel with the third and fourth support sidewalls and offset inwardly therefrom.

12. The stacking support of claim 9, wherein the first tube has a fifth support sidewall that is substantially orthogonal with the first support sidewall,
    the second tube has a sixth support sidewall that is substantially orthogonal with the second support sidewall,
    the third tube has a seventh support sidewall that is substantially orthogonal with the third support sidewall,
    the fourth tube has an eighth support sidewall that is substantially orthogonal with the fourth support sidewall,
    the first sidewall is substantially parallel with the first and second support sidewalls and offset inwardly therefrom,
    the second sidewall is substantially parallel with the third and fourth support sidewalls and offset inwardly therefrom,
    the third sidewall is substantially parallel with the sixth and seventh support sidewalls and offset inwardly therefrom, and
    the fourth sidewall is substantially parallel with the fifth and eighth support sidewalls and offset inwardly therefrom.

13. The stacking support of claim 1 having a substantially square outer cross-sectional shape with corners, the first, second, third, and fourth tubes being positioned at the corners.

14. The stacking support of claim 1 having a height of about 2.5 inches and a width of about 2.5 inches.

15. The stacking support of claim 14 having a length of about 4 feet.

16. The stacking support of claim 1 extending along a longitudinal axis, wherein the stacking support is symmetric about both vertical and horizontal planes extending along the longitudinal axis.

17. The stacking support of claim 1 constructed by forming an extrusion.

18. The stacking support of claim 1, wherein the channel has a first open end opposite a second open end.

19. The stacking support of claim 18, wherein each of the first, second, third, and fourth tubes has a third open end opposite a fourth open end.

20. The stacking support of claim 1 constructed entirely of aluminum or an aluminum alloy.

21. The stacking support of claim 1 configured to be placed in a kiln with a stack of wood positioned thereupon during a process comprising at least one of a drying process and a curing process.

22. The stacking support of claim 21, further comprising:
a longitudinally extending airflow channel positioned immediately adjacent an underside of the stack of wood, air traveling through the airflow channel during the process.

23. The stacking support of claim 21 being configured to resist deflection and help prevent the stack of wood from warping.

24. The stacking support of claim 1 constructed from a material that does not absorb or wick moisture.

25. The stacking support of claim 1 constructed from an inorganic material.

26. The stacking support of claim 1, wherein the first sidewall is configured to be coupled to an underside of a platform by fasteners.

27. The stacking support of claim 1 configured to support an item, wherein the channel is configured to allow a band to pass therethrough and tie the item to the stacking support.

28. The stacking support of claim 1 configured to support an item and space the item above a support surface such that forks of a forklift or fork truck will pass between the item and the support surface.

* * * * *